US011594985B2

(12) United States Patent
Ashizawa et al.

(10) Patent No.: US 11,594,985 B2
(45) Date of Patent: Feb. 28, 2023

(54) LENS BARREL AND IMAGING DEVICE

(71) Applicant: NIKON CORPORATION, Tokyo (JP)

(72) Inventors: Takatoshi Ashizawa, Yokohama (JP); Azusa Muto, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 73 days.

(21) Appl. No.: 17/324,587

(22) Filed: May 19, 2021

(65) Prior Publication Data

US 2021/0273586 A1 Sep. 2, 2021

Related U.S. Application Data

(63) Continuation of application No. 16/314,628, filed as application No. PCT/JP2017/024209 on Jun. 30, 2017, now Pat. No. 11,043,910.

(30) Foreign Application Priority Data

Jun. 30, 2016 (JP) .............................. JP2016-130661

(51) Int. Cl.
*H02N 2/16* (2006.01)
*H02N 2/00* (2006.01)
*H02N 2/14* (2006.01)

(52) U.S. Cl.
CPC ........... *H02N 2/163* (2013.01); *H02N 2/0065* (2013.01); *H02N 2/142* (2013.01); *H02N 2/147* (2013.01)

(58) Field of Classification Search
CPC ...... H02N 2/163; H02N 2/0065; H02N 2/142; G02B 7/08; B06B 1/06
See application file for complete search history.

(56) References Cited

U.S. PATENT DOCUMENTS 5,686,776 A 11/1997 Takagi et al.
9,680,086 B2 * 6/2017 Murakami ............ H01L 41/083
(Continued)

FOREIGN PATENT DOCUMENTS

CN 101053089 A 10/2007
JP H01-17354 B2 3/1989
(Continued)

OTHER PUBLICATIONS

Jul. 23, 2019 Office Action issued in Chinese Patent Application No. 201780040601.7.
(Continued)

*Primary Examiner* — Emily P Pham
(74) *Attorney, Agent, or Firm* — Oliff PLC

(57) ABSTRACT

A lens barrel includes: an electromechanical conversion element; an elastic body having a joining surface, a drive surface, and grooves; a motion member rotating by vibration wave of the drive surface; a rotating ring having a recess part and rotating by rotation of the motion member; a moving ring engaged to the recess part and moving to an optical axis direction by rotation of the rotating ring; and a lens held in the moving ring; wherein the element is made of a material having sodium potassium niobate, potassium niobate, sodium niobate or barium titanate, wherein a value of $T/(B+C)$ is within a range of from 1.3 to 2.8 when: length from the drive surface to a base unit of the groove is defined as T; length from the base unit of the groove to the joining surface is defined as B; and thickness of the element is defined as C.

9 Claims, 10 Drawing Sheets

(56) References Cited

U.S. PATENT DOCUMENTS

| | | |
|---|---|---|
| 2006/0113868 A1 | 6/2006 | Sakatani et al. |
| 2007/0159028 A1 | 7/2007 | Nagaya et al. |
| 2009/0303622 A1 | 12/2009 | Ashizawa |
| 2012/0032557 A1 | 2/2012 | Furuta et al. |

FOREIGN PATENT DOCUMENTS

| | | |
|---|---|---|
| JP | 2003-244974 A | 8/2003 |
| JP | 2012-039754 A | 2/2012 |
| JP | 2016-052188 A | 4/2016 |

OTHER PUBLICATIONS

Wu Yekun et al.; "The design, facture and mechanism simulation of the traveling wave ultrasonic motor;" Wanfang Academic Conference Database; Sep. 17, 2006; pp. 24-44.

Wang Huayun et al.; "Study on Ultrasonic Motor Drives;" Chinese Doctoral Dissertations & Master's Theses Full-text Database Engineering Science and Technology II; No. 5; pp. 21-60.

Jul. 20, 2020 Office Action issued in Chinese Patent Application No. 201780040601.7.

Zeng Liang; "Research on Stator Vibration Characteristics of Ring-type Traveling Wave Ultrasonic Motor"; Chinese Master's Theses Full-text Database Engineering Science and Technology II; 2010; No. 14; pp. 41-59.

Sep. 3, 2020 Office Action issued in Taiwanese Patent Application No. 106122299.

Feb. 22, 2021 Notice of Allowance issued in U.S. Appl. No. 16/314,628.

Mar. 23, 2021 Office Action issued in Japanese Patent Application No. 2018-525303.

\* cited by examiner

LENS BARREL AND IMAGING DEVICE

CLAIM OF PRIORITY

This is a Continuation of application Ser. No. 16/314,628 filed Dec. 31, 2018, which is a National Stage Application of PCT/JP2017/024209 filed Jun. 30, 2017, which in turn claims priority from Japanese patent application JP 2016-130661 filed on Jun. 30, 2016, the contents of which are hereby incorporated by reference into this application.

BACKGROUND

The present invention relates to a lens barrel and an imaging device.

A vibration wave motor generates a progressive vibration wave (hereinafter referred to as a progressive wave) on a drive surface of an elastic body through making use of expansion/contraction of a piezoelectric body (see Japanese Patent Examined Publication H1-17354). A vibrator in such a vibration wave motor is generally configured of an electromechanical conversion element (hereinafter referred to as a piezoelectric body) and an elastic body. Up until now, piezoelectric bodies have been made of a material called lead zirconate titanate. This material is commonly referred to as "PZT". However, in recent years, a lead-free material and the application of this material to a vibration wave motor have been studied in order to lessen burden on the environment (see Japanese Patent Examined Publication H1-17354).

SUMMARY

The present invention is a lens barrel comprising: an electromechanical conversion element; an elastic body which has a joining surface on which the electromechanical conversion element is joined and a drive surface on which a vibration wave is generated due to vibration of the electromechanical conversion element, the elastic body on which a plurality of grooves are formed; a motion member which makes contact with the drive surface and is configured to rotate by the vibration wave; a rotating ring which has a recess part and is configured to rotate by rotation of the motion member; a moving ring which has a protrusion part engaged to the recess part and is configured to move to an optical axis direction by rotation of the rotating ring; and a lens which is held in the moving ring; wherein the electromechanical conversion element is made of a material having sodium potassium niobate, potassium niobate, sodium niobate or barium titanate as a principle component, wherein a value of T/(B+C) is within a range of from 1.3 to 2.8 when: length from the drive surface to a base unit of at least one groove of the plurality of grooves is defined as T; length from the base unit of the groove to the joining surface is defined as B; and thickness of the electromechanical conversion element is defined as C.

An imaging device in the present invention comprises the lens barrel and a camera body.

DETAILED DESCRIPTION OF THE EMBODIMENTS

Figure 1:
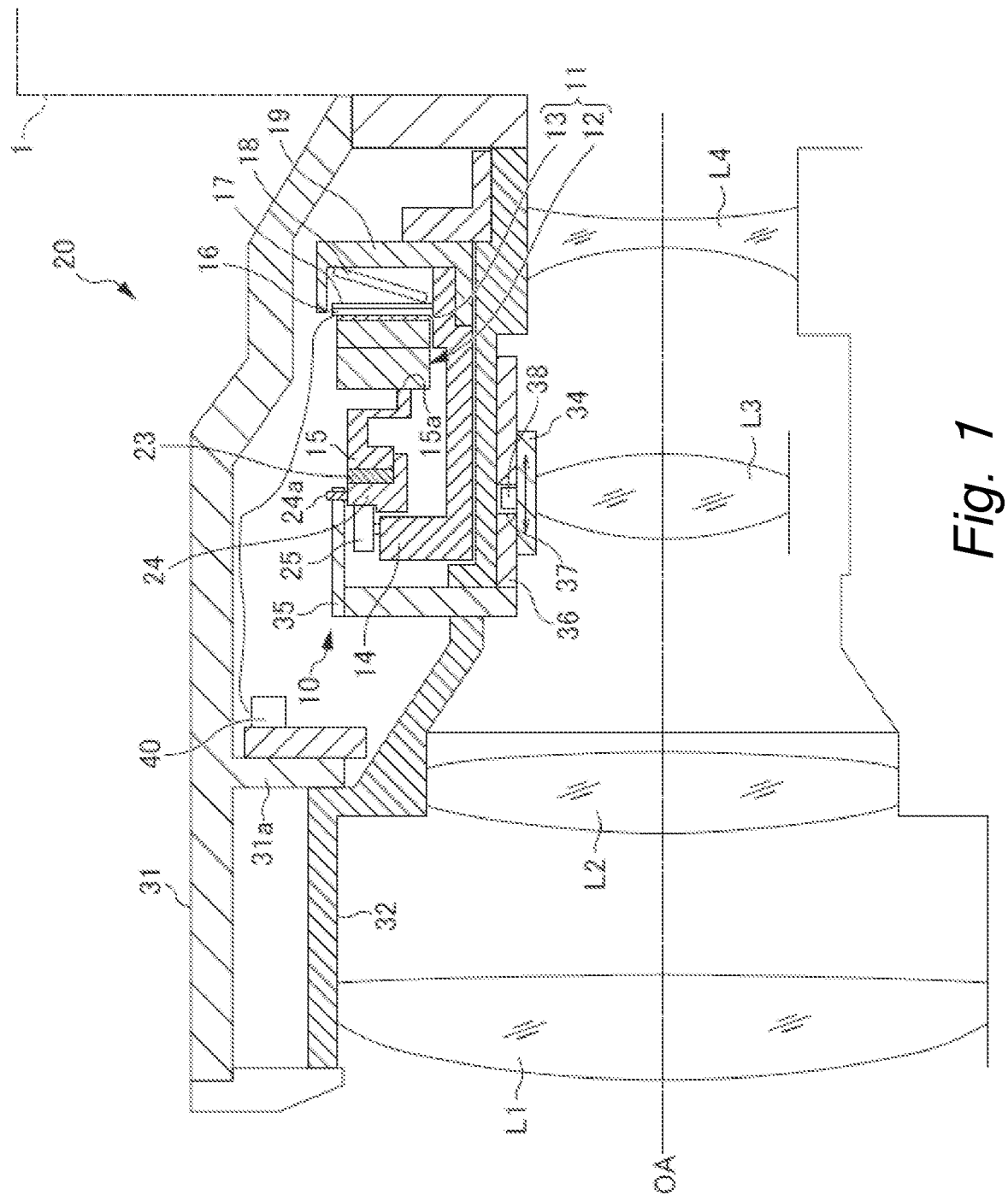
FIG. 1 is schematic cross-sectional diagram of a lens barrel to which a vibration wave motor is incorporated and a camera of the embodiments.

Embodiments of a vibration wave motor 10 are described in detail below with reference the attached drawings. FIG. 1 is schematic cross-sectional diagram of a lens barrel 20 to which a vibration wave motor 10 is incorporated and a camera 1 of the embodiments.

In the embodiments, the annular vibration wave motor 10 is given as an example of a vibration wave motor.

A lens barrel 20 includes an outer fixed tube 31 and an inner fixed tube 32. A motor unit that includes the vibration wave motor 10 is fixed between the outer fixed tube 31 and the inner fixed tube 32.

A drive circuit 40 is provided between the outer fixed tube 31 and the inner fixed tube 32 of the lens barrel 20 and is configured to drive and control the vibration wave motor 10, detect the number of revolutions of the vibration wave motor 10, detect a vibration sensor, and the like.

Figure 2:
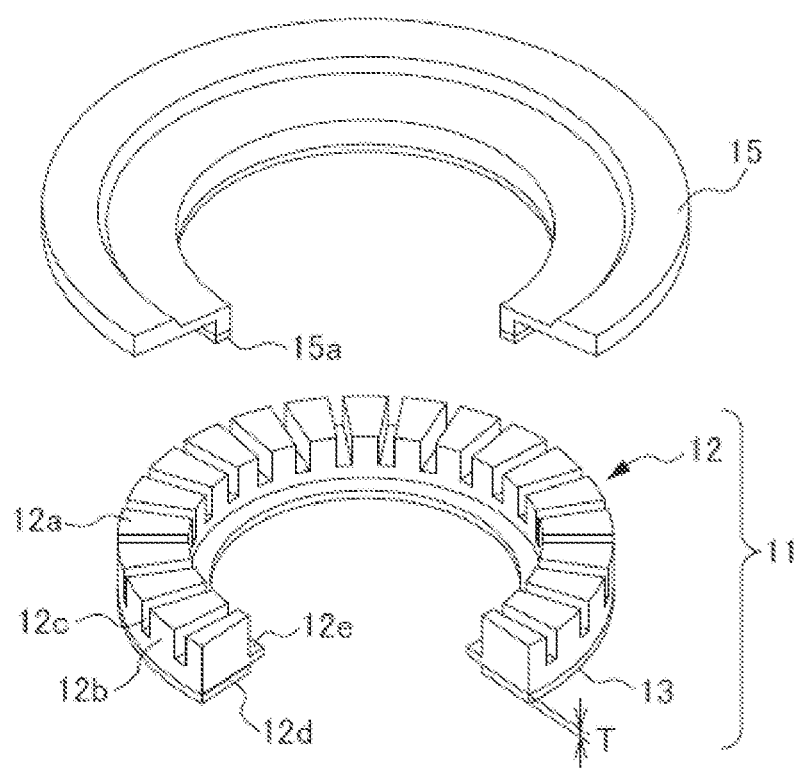
FIG. 2 is a perspective view illustrating part of the vibrator and the mover cut out from the vibration wave motor.

Next, the vibration wave motor 10 is described. The vibration wave motor 10 includes a vibrator 11 and a mover 15. FIG. 2 is a perspective view illustrating part of the vibrator 11 and the mover 15 cut out from the vibration wave motor 10.

The vibrator 11 is configured of an electromechanical conversion element (hereinafter referred to as a piezoelectric body 13) exemplified by a piezoelectric element or an electrostrictive element that converts electrical energy into mechanical energy, and an elastic body 12 joined to the piezoelectric body 13. Progressive waves are generated in the vibrator 11. In this embodiment, nine progressive waves are described as examples.

The elastic body 12 is made of a metal material having a high sharpness of resonance. The elastic body 12 has an annular shape. Grooves 12c are cut into a surface of the elastic body 12 that is opposite to the surface joined to the piezoelectric body 13. A protruding unit 12b (portion with no grooves 12c) of the elastic body 12 has a tip surface that is a drive surface 12a and is brought into pressure contact with the mover 15. The grooves 12c are cut out in order to allow the elastic body 12 to approach the piezoelectric body 13 side as closely as possible to a neutral plane of the progressive wave and amplify the amplitude of the progressive wave on the drive surface 12a.

An inner peripheral side of the elastic body 12 is provided with a flange unit 12e that extends in a radial direction. The flange unit 12e is formed with a notch unit (not shown). A protruding unit (not shown) formed on a fixing unit 14 is fitted into the notch unit to restrict movement of the elastic body 12 in a circumferential direction.

Figure 3:
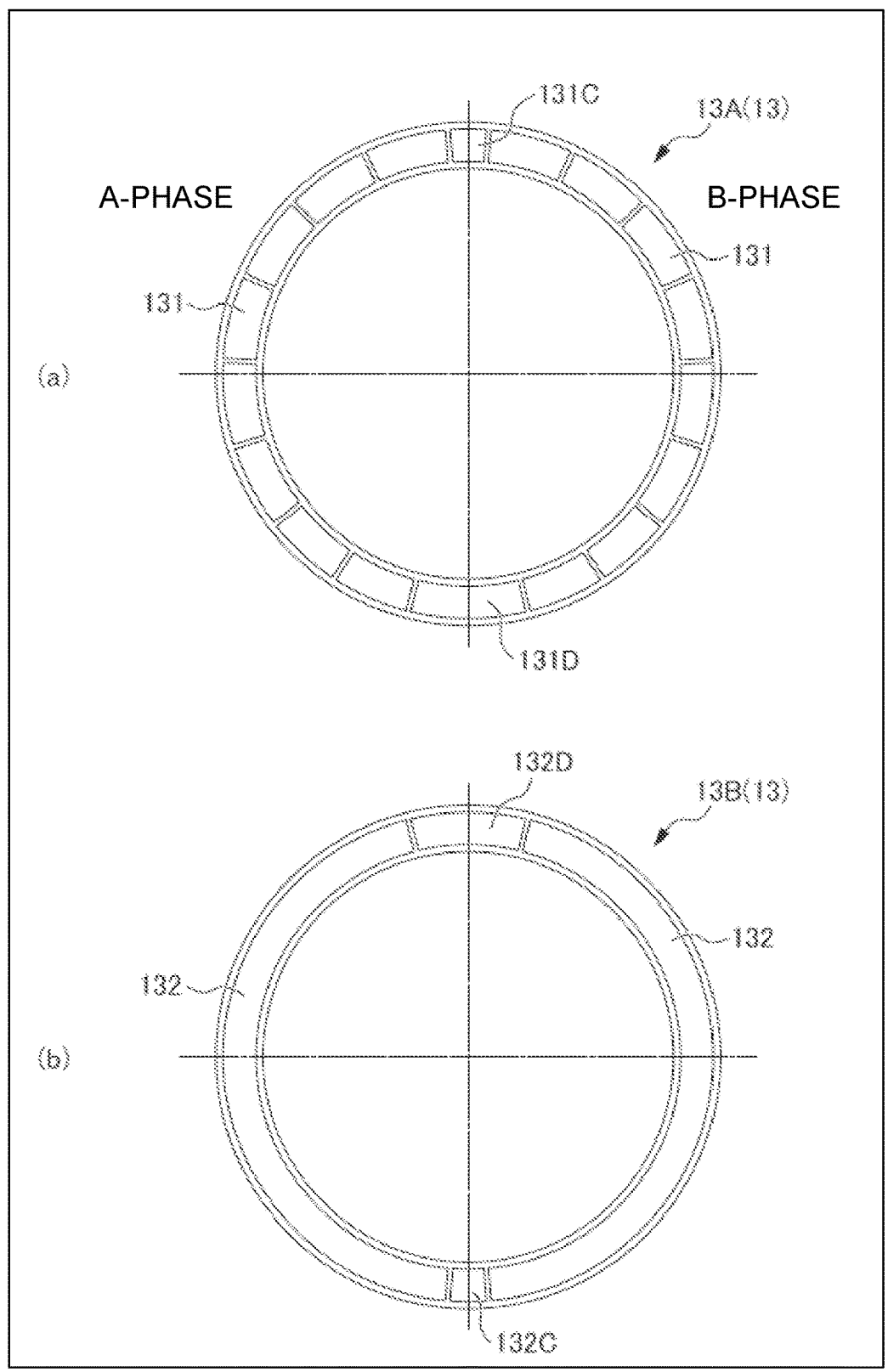
FIG. 3 is a diagram for illustrating the piezoelectric body, where (a) illustrates a surface which joins with the elastic body and (b) illustrates the rear of that surface.

FIG. 3 is a diagram for illustrating the piezoelectric body 13, where FIG. 3(a) illustrates a surface which joins with the elastic body and FIG. 3(b) illustrates the rear of that surface. The joining surface of the piezoelectric body 13 is divided into two phases (an A-phase and a B-phase) along the circumferential direction. In each phase, elements with alternating polarities every half wavelength are arranged in a row, and a quarter wavelength interval is provided between the A-phase and the B-phase. Electrodes that are provided on a front surface and electrode patterns are described later.

The mover 15 is made of a lightweight metal such as aluminum. A sliding surface 15a of the mover 15 is provided with a sliding material on a front surface thereof to improve wear resistance. A vibration absorbing member 23 such as rubber is disposed on a side of the mover 15 opposite to the vibrator 11. This member is used to absorb vibration of the mover 15 in a vertical direction. An output transmission member 24 is disposed on the vibration absorbing member 23.

The vibration absorbing member 23 such as rubber is disposed on the mover 15 to absorb vibration of the mover 15 in the vertical direction. The output transmission member 24 is disposed on the vibration absorbing member 23.

The output transmission member 24 restricts movement of the mover 15 in a pressure direction and the radial direction using a bearing 25 provided on the fixing unit 14. The output transmission member 24 has a protruding unit 24a from which a fork 35 connected to a cam ring 36 is fitted. The cam ring 36 rotates together with rotation of the output transmission member 24.

In the cam ring 36, a key groove 37 is cut obliquely to the cam ring 36. A fixing pin 38 provided on an AF ring 34 is fitted into the key groove 37. Rotationally driving of the cam ring 36 allows the AF ring 34 to drive in a straight-ahead direction in an optical axis direction and stop the AF ring 34 at a desired position.

A vibration transmission prevention member 16 such as a nonwoven fabric or felt is provided between the piezoelectric body 13 and a pressurizing spring 18. The vibration transmission prevention member 16 is configured to not transmit vibration of the vibrator 11 to the pressurizing spring 18, a press ring 19, or any other component.

The pressurizing spring 18 is configured of a disc spring or a wave washer.

The press ring 19 is mounted to the fixing unit 14 using a spring. Through fixing the press ring 19 to the fixing unit 14, the output transmission member 24, the mover 15, the vibrator 11 and the pressurizing spring 18 are configured as one motor unit.

As described above, FIG. 3 is a diagram illustrating the piezoelectric body 13, where FIG. 3(a) illustrates a surface which joins with the elastic body and FIG. 3(b) illustrates the rear of that surface. A plurality of electrode units 131 are formed on a first surface 13A, which is the joining surface of the piezoelectric body 13. In this embodiment, 16 electrode units 131 are provided. These electrode units 131 each have a length corresponding to half the wavelength of the progressive wave along the circumferential direction.

The electrode units 131 are divided into groups of eight on each side. One group is configured to transmit A-phase drive voltage and the other group is configured to transmit B-phase drive voltage. Electrode units 131C corresponding to a quarter wavelength and electrodes 131D corresponding to a three-quarter wavelength are provided between the A-phase and the B-phase for a total of 18 electrode units 131.

In this embodiment, the side provided with the 18 electrode units 131 joins with the elastic body 12.

As illustrated in FIG. 3(b), a second side 13B opposite to the first side 13A is provided with an electrode at a position on the first surface 13A provided with the A-phase electrode unit. This electrode is formed by joining the group of A-phase electrodes.

Similarly, electrodes formed by joining the group of B-phase electrodes are provided at a position of the group of B-phase electrodes. Quarter wavelength electrode units 132C and three-quarter wavelength electrode units 132D are provided between the A-phase and the B-phase to form a total of four electrode units 132.

In this embodiment, an A-phase drive signal and a B-phase drive signal are applied to the second surface, and a quarter wave length unit short-circuits with the elastic body 12 due to conductive paint to be grounded.

The material of the piezoelectric body 13 used in this embodiment is called a lead-free material and has sodium potassium niobate, potassium niobate, sodium niobate or barium titanate as a principle component.

Figure 4:
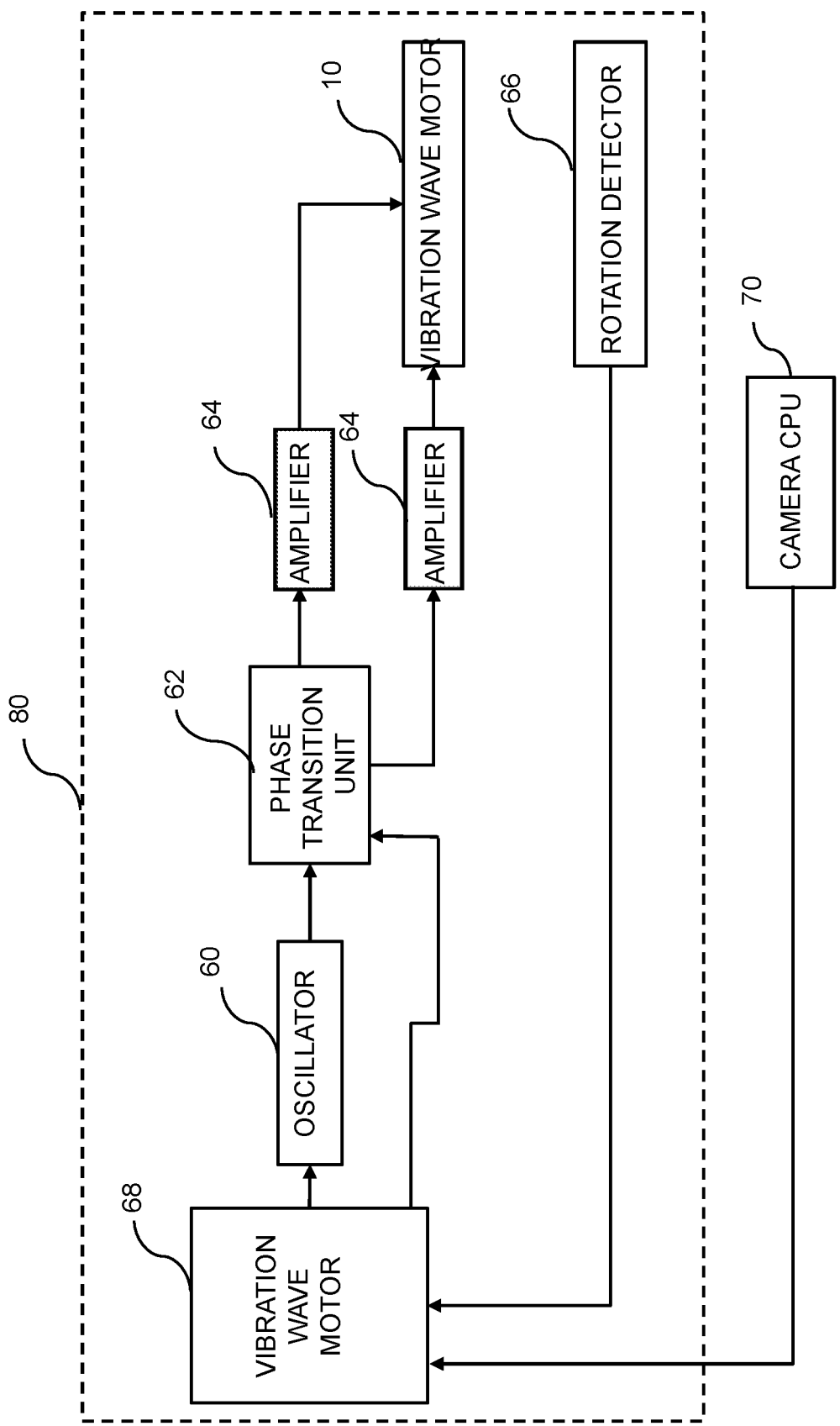
FIG. 4 is a block diagram for explaining a drive device of the vibration wave motor according to the embodiment.

FIG. 4 is a block diagram for explaining a drive device 80 of the vibration wave motor 10 according to the embodiment.

First, a control unit 68 and drive of the vibration wave motor 10 are described.

An oscillator 60 generates a drive signal at a predetermined frequency based on a command from the control unit 68. A phase shifting unit 62 divides the drive signal generated by the oscillator 60 into two drive signals having different phases.

An amplifier 64 boosts each of the two drive signals separated by the phase shifting unit 62 to a predetermined voltage. The drive signals output from the amplifier 64 are transmitted to the vibration wave motor 10. Applying these drive signals to the vibration wave motor 10 allows the vibrating body to generate a progressive wave and drive the mover 15.

A rotation detector 66 is configured of, for example, an optical encoder or a magnetic encoder. The rotation detector 66 detects position or speed of a driven object driven by drive of the mover 15 and transmits the detected value to the control unit 68 as an electrical signal.

The control unit 68 controls drive of the vibration wave motor 10 based on a drive command output from a CPU in the lens barrel 20 or in the camera 1 body. The control unit 68 receives a detection signal from the rotation detector 66, determines position information and speed information on the basis of the value of the detection signal and controls frequency of the oscillator 60 so as to position the vibration motor 10 at a target position. The control unit 68 changes the phase difference of the phase shifting unit 62 when the direction of rotation is switched.

Next, operation of the vibration wave motor 10 according to this embodiment is described.

When a drive command is issued from the control unit 68, the oscillator 60 generates a drive signal. This drive signal is divided by the phase shifting unit 62 into two drive signals having different phases by 90° and boosted to a predetermined voltage by the amplifier 64.

The drive signals are applied to the piezoelectric body 13 of the vibration wave motor 10 to excite the piezoelectric body 13. This excitation causes ninth-order bending vibration to be generated in the elastic body 12.

The piezoelectric body 13 is divided into the A-phase and the B-phase and the drive signals are applied to the A-phase and the B-phase, respectively.

The positional phases of the ninth-order bending vibration generated from the A-phase and the ninth-order bending vibration generated from the B-phase are shifted from each other by a quarter wavelength. In addition, the A-phase drive signal and the B-phase drive signal are shifted from each other by 90°. Therefore, the two bending vibrations are combined to form nine progressive waves.

Elliptical motion occurs at the crest of the progressive wave. Therefore, the mover 15 which has made pressure contact with the drive surface 12a is frictionally driven by this elliptical motion. An optical encoder is disposed in the driven body driven by drive of the mover 15. This optical encoder outputs an electrical pulse which is transmitted to the control unit 68. The control unit 68 can acquire current position and current speed on the basis of this the electrical pulse.

In this embodiment, as described above, a lead-free material is used for the piezoelectric body 13 in order to lessen burden on the environment.

However, the inventors of the present invention conducted extensive study and found that it is difficult to obtain driving performance similar to that of a PZT (lead zirconate titanate) piezoelectric body under the same conditions when the vibration wave motor 10 is equipped with the lead-free piezoelectric body 13.

In order to study the reason behind this, the inventors used computer aided engineering (CAE) analysis and other methods to investigate and found that the lead-free piezoelectric body 13 and PZT have different densities.

When a niobium-based material is used for the lead-free piezoelectric body 13, the lead-free piezoelectric body 13 has a density of 4.2 to $4.7 \times 10^3$ kg/m³ and when a barium titanate-based material is used for the lead-free piezoelectric body 13, the lead-free piezoelectric body 13 has a density of 5.5 to $6.0 \times 10^3$ kg/m³. In contrast, PZT has a density of 7.7 to $7.8 \times 10^3$ kg/m³.

In other words, the lead-free piezoelectric body 13 is 20-plus % to 40-plus % less dense than PZT.

(Equivalent Circuit)

Figure 5:
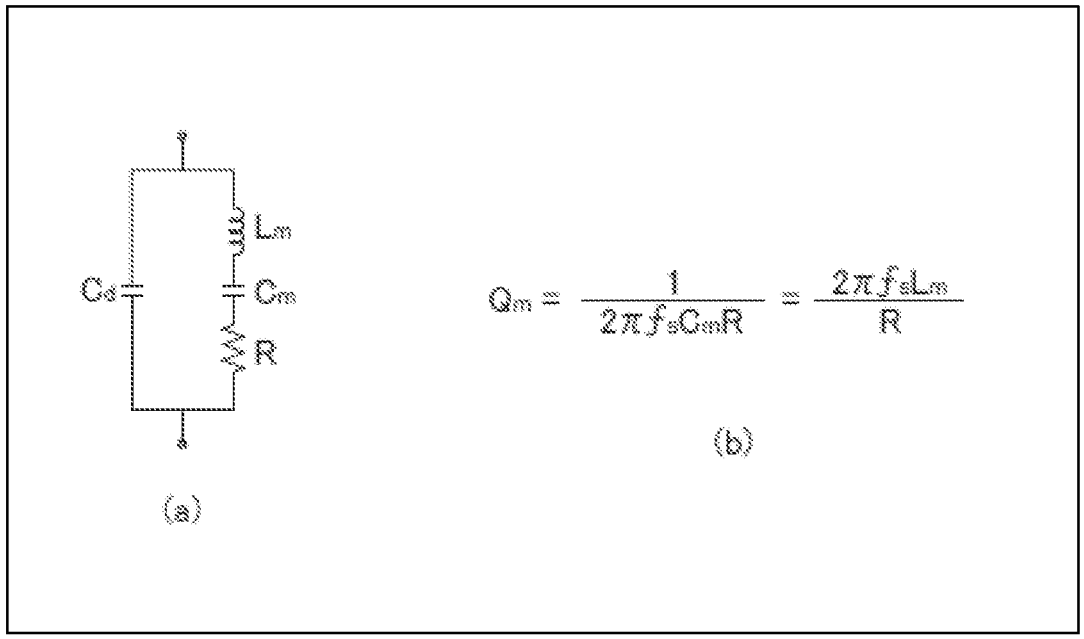
FIG. 5 is a diagram for explaining an equivalent circuit of the vibrator in the vibration wave motor, where (a) illustrates the equivalent circuit and (b) is an equation for finding a mechanical quality factor.

FIG. 5 is a diagram for explaining an equivalent circuit of the vibrator 11 in the vibration wave motor 10, where FIG. 5(a) illustrates the equivalent circuit and FIG. 5(b) is an equation for finding a mechanical quality factor Qm.

In the diagrams, Lm represents equivalent inductance, Cm represents equivalent capacitance, R represents resonance resistance and Cd represents electrostatic capacity of the piezoelectric body 13.

The values of Lm and Cm have an effect on the resonance characteristics of the vibrator 11. The mechanical quality factor Qm is a scale indicating resonance characteristics, with a larger Qm value indicating better resonance characteristics.

As can be seen from Equation 1, the value of Qm increases as the Lm value increases.

Table 1 below shows the Lm values and Cm values calculated using CAE analysis when various materials were used for the piezoelectric body 13.

Here, a model with the following dimensions was used as the piezoelectric body 13:

Outer diameter: 62 mm
Inner diameter: 55 mm
Thickness of vibrator 11: 4.22 mm

Number of grooves 12c provided on drive surface 12a side: 48

Depth of groove 12c: 1.92 mm.

TABLE 1

|  | Density | Various factor values of equivalent circuit | |
|---|---|---|---|
|  | $10^3$ kg/m³ | Lm [H] | Cm [nF] |
| PZT | 7.7 | 0.341 | 0.064 |
| Barium titanate | 6.0 | 0.325 | 0.065 |
| Niobium-based material | 4.2 | 0.313 | 0.066 |

As shown in Table 1, the Lm value with PZT is 0.341, whereas the Lm value with a barium titanate-based material is 0.325 and the Lm value with a niobium-based material is 0.313. In other words, the Lm value decreases as density decreases. When a lead-free piezoelectric body 13 is incorporated into the vibrator 11, the Lm value is smaller than when a PZT piezoelectric body is incorporated into the vibrator 11. In other words, the mechanical quality factor Qm when incorporating a lead-free piezoelectric body 13 is smaller than when incorporating a PZT piezoelectric body. Because of this, the inventors found that it is difficult to achieve desired resonance characteristics when incorporating a lead-free piezoelectric body 13, compared to when incorporating a PZT piezoelectric body 13.

Because the vibration wave motor 10 operates under the principle of using resonance, drive performance when combined with the mover 15 is difficult to achieve when desired vibration characteristics in the vibrator 11 cannot be obtained. Therefore, with the vibrator 11 employing a lead-free piezoelectric body 13, there is a tendency that it is difficult to obtain desired driving performance.

As a result, the inventors studied trends of the dimensions of vibrators 11 with which the Lm value increases in order to improve the resonance characteristics of the vibrator 11 employing a lead-free piezoelectric body 13.

Here, T represents the depth of the grooves 12c formed in comb teeth of the elastic body 12, B represents the thickness to a joining surface with the piezoelectric body 13 from the base unit of the groove 12c, and C represents the thickness of the piezoelectric body 13.

Figure 6:
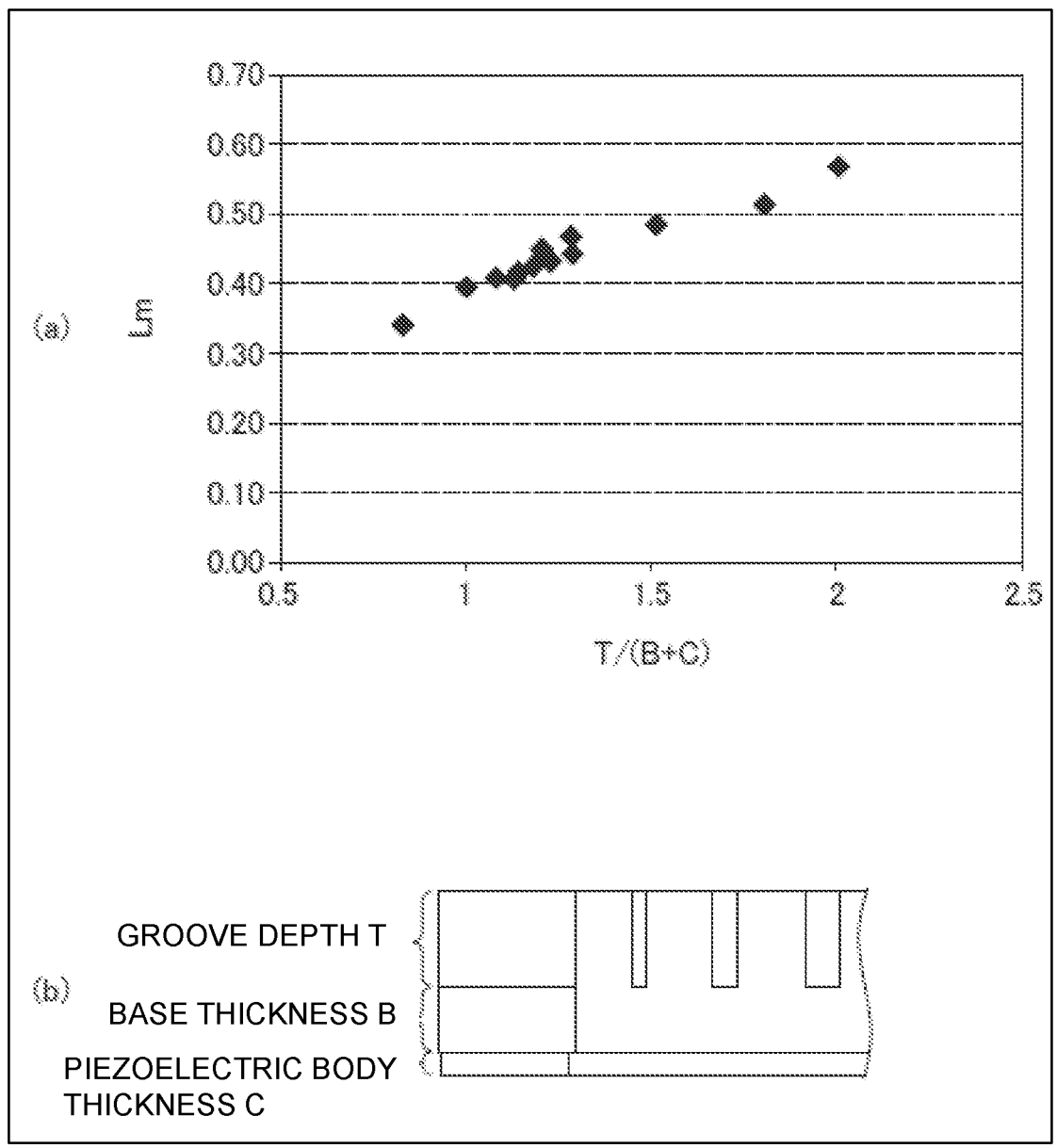
FIG. 6 is a graph for illustrating the results of calculating the Lm value using CAE analysis when changing T value, B value, and C value, respectively.

FIG. 6 is a graph for illustrating the results of calculating the Lm value using CAE analysis when changing the above-mentioned values within the following ranges:

T value: 1.9 to 2.8,

B value: 1.3 to 1.8,

C value: 0.25 to 0.5.

The results of this calculation show that there is a correlation between the value of T/(B+C) and Lm. This is because Lm increases as the T value increases, and also increases as the B value or the C value decreases.

As a result, CAE was used to calculate the Lm value of the vibrator 11 in each piezoelectric body material being either PZT or a niobate-based material with a density lower than PZT (4.2 to $4.7 \times 10^3$ kg/m³) when the value of T/(B+C) was changed. The results of this calculation when T/(B+C) is 1.2, 1.3, 2 and 2.8 are shown in Table 2.

TABLE 2

| | Density $10^3$ | T/(B + C) | | | |
|---|---|---|---|---|---|
| | kg/m³ | 1.2 | 1.3 | 2 | 2.8 |
| PZT | 7.7 | Lm = 0.431 | | | |
| Niobium-based material | 4.7 | Lm = 0.398 | Lm = 0.414 | Lm = 0.526 | Lm = 0.745 |
| Potassium sodium | 4.2 | Lm = 0.392 | Lm = 0.409 | Lm = 0.522 | Lm = 0.736 |

Table 2 shows the results of calculating the Lm value using CAE analysis when changing the following values within the following ranges:
T value: 1.9 to 3.5,
B value: 1.0 to 2.2,
C value: 0.25 to 0.8.

The range of 4.2 to 4.7×10³ kg/m³ is the range of density of a general niobium-based voltage material. Therefore, CAE analysis was performed with the upper limit density value and lower limit density value of that range.

As shown in Table 2, it was found that the Lm value decreases as density decreases and that increasing the value of T/(B+C) makes it possible to obtain values that correspond to the vibrator 11 equipped with PZT.

However, damage when the value of T/(B+C) increases is also to be considered. Therefore, the inventors tested vibration when equipped with a niobium-based material to investigate resonance characteristics of the material as a vibration motor.

The inventors created 12 types of samples in which the piezoelectric body 13 was made of a material with potassium sodium niobate as a primary component, the elastic body 12 was made of stainless steel, and the T and B values of the elastic body 12 and the C value of the piezoelectric body 13 were changed, and investigated the voltage (drive voltage) of the drive signal at which each sample could be driven.

The samples had values in the following ranges:
T value: 1.5 to 2.0
B value: 0.35 to 0.75
C value: 0.25 to 0.5.
In addition, the density of the piezoelectric body 13 in the samples was 4.4×10³ kg/m³.

It is believed that resonance characteristics in an actual vibrating motor become better as the drive voltage at which the motor can be driven decreases, and that resonance characteristics in an actual vibrating motor become worse as the drive voltage at which the motor can be driven increases.

Figure 7:
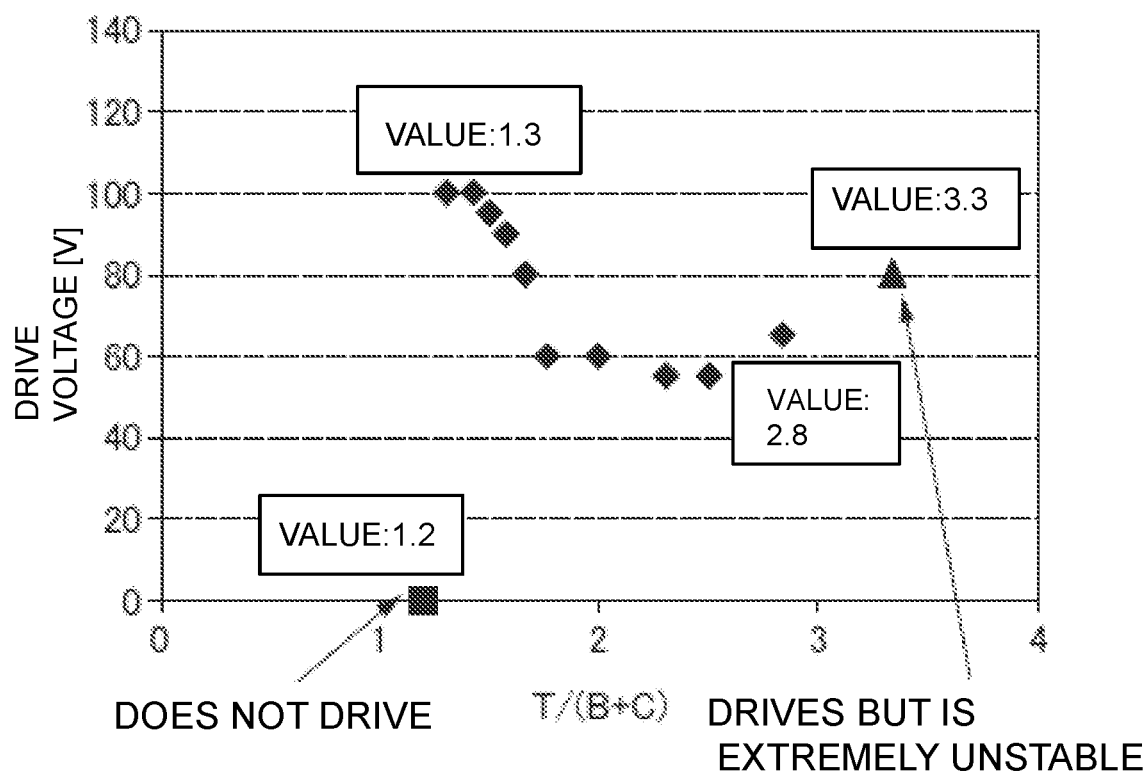
FIG. 7 is a graph for illustrating the relationship between T/(B+C) and drive voltage.

The results of measurement are shown in FIG. 7.

When the value of T/(B+C) was 1.2, the vibration wave motor 10 did not start up even after application of a 100 V drive voltage.

The vibration wave motor 10 could be driven at an appropriate drive voltage at 100 V or less when the value of T/(B+C) was in the range of from 1.3 to 2.8.

When the value of T/(B+C) was 3.33, the vibration wave motor 10 was driven but the rotation state of the mover 15 was slightly unstable.

When the value of T/(B+C) was increased, the Lm value and the Qm value of the vibrator 11 increased. However, there were some cases where an electromechanical joining factor Kvn of the vibrator 11 decreased to cause an adverse effect that decreased the efficiency of converting electrical energy into mechanical energy.

When the value of T/(B+C) was 3.33, it was believed that the above-mentioned adverse effect causes the rotation state of the mover 15 to become slightly unstable.

First Embodiment

A first embodiment of the present invention has the following configuration based on the results of the above-described tests.

The piezoelectric body 13 is made of a material which has potassium sodium niobate as a primary component and has a density of 4.2 to 4.7×10³ kg/m³. Stainless steel is used for the elastic body 12. The value of T/(B+C) is within a range of from 1.3 to 2.8.

This configuration ensures resonance characteristics as the vibrator 11 even if the density of the piezoelectric body 13 decreases and drive performance when combined with the mover 15.

When T/(B+C) was 1.3, the results of calculation with CAE analysis showed that the Lm value of the vibrator 11 was about 0.41 and, when T/(B+C) was 2.8, the Lm value of the vibrator 11 was about 0.74.

Second Embodiment

Next, a second embodiment is described.

In the second embodiment, the piezoelectric body 13 is made of a material having barium titanate as a primary component and has a density of 5.5 to 6.0×10³ kg/m³. Stainless steel is used for the elastic body 12. The value of T/(B+C) is in a range of from 1.3 to 2.8.

Even when the piezoelectric body 13 is made of barium titanate, the piezoelectric body 13 is less dense than PZT, and hence the Lm value of the vibrator 11 decreases and sufficient resonance characteristics as the vibrator 11 cannot be obtained. Under this state, drive performance cannot be obtained even when combined with the mover 15.

Therefore, in this embodiment, the Lm value of the vibrator 11 was calculated using CAE analysis after changing the value of T/(B+C).

Table 3 shows results when the Lm values of each vibrator 11 were calculated when the density was 5.5×10³ kg/m³ and 6.0×10³ kg/m³, and the value of T/(B+C) has been changed to 1.2, 1.3, 2 and 2.8.

The range of 5.5 to 6.0×10³ kg/m³ is the range of density of a general barium titanate-based voltage material, and hence CAE analysis was performed with the upper limit density value and lower limit density value of that range. Note that CAE analysis was performed with a T value of from 1.9 to 3.5, a B value of from 1.0 to 2.2 and a C value of from 0.25 to 0.8.

TABLE 3

| | Density $10^3$ | T/(B + C) | | | |
|---|---|---|---|---|---|
| | kg/m³ | 1.2 | 1.3 | 2 | 2.8 |
| PZT | 7.7 | Lm = 0.431 | | | |
| Barium titanate-based material | 6.0 | Lm = 0.407 | Lm = 0.424 | Lm = 0.541 | Lm = 0.751 |
| | 5.5 | Lm = 0.400 | Lm = 0.418 | Lm = 0.533 | Lm = 0.747 |

When the value of T/(B+C) was 1.3, the Lm value was about 0.42. When the T/(B+C) was 2.8, the Lm value of the vibrator 11 was about 0.75.

Even when the piezoelectric body 13 was made of a material having a density of 5.5 to 6.0×10$^3$ kg/m$^3$, the relationship between the value of T/(B+C) and the Lm was almost the same value as that of material with a density of from 4.2 to 4.7×10$^3$ kg/m$^3$.

Therefore, the value of T/(B+C) is believed to be appropriate within a range of from 1.3 to 2.8.

When the value of T/(B+C) was from 1.3 to 2.8, both the Lm value of a niobium-based material (density: 4.2 to 4.7×10$^3$ kg/m$^3$) and the Lm value of a barium titanate-based material (density: 5.5 to 6.0×10$^3$ kg/m$^3$) had the same value relationship, and hence a value of T/(B+C) of from 1.3 to 2.8 is considered to be within an appropriate range with a density of from 4.2 to 6.0×10$^3$ kg/m$^3$.

Third Embodiment

Next, a third embodiment of the present invention is described.

Figure 8:
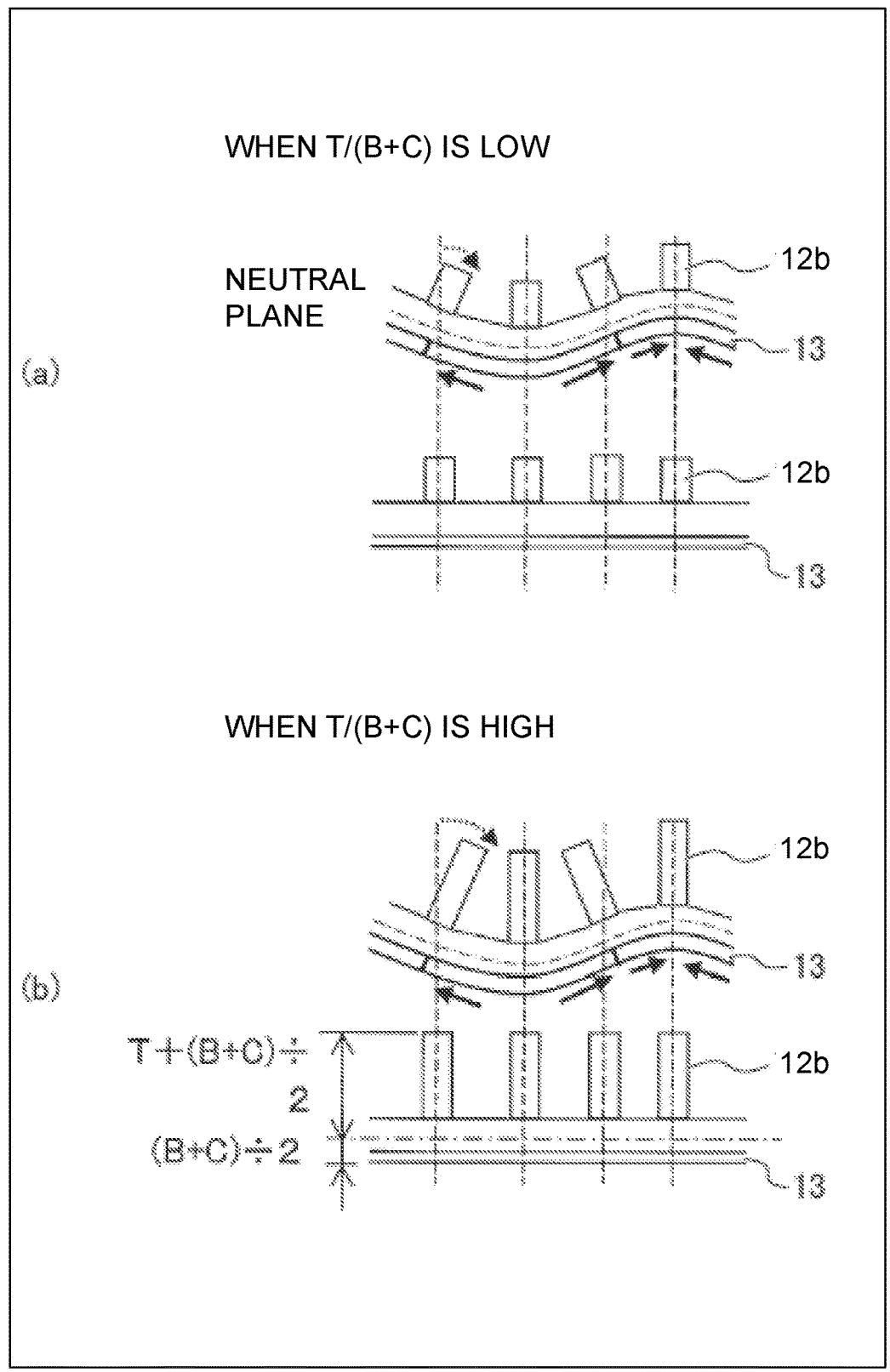
FIG. 8 is a diagram for explaining the relationship between T/(B+C) and the behavior of the protruding unit in the vibrator, where (a) illustrates an example where T/(B+C) is low and (b) illustrates T/(B+C) is high.

FIG. 8 is a diagram for explaining the relationship between T/(B+C) and the behavior of the protruding unit 12$b$ in the vibrator 11. FIG. 8($a$) illustrates an example where T/(B+C) is low (when, for example, the depth of the groove 12$c$ is shallow) and FIG. 8($b$) illustrates behavior of the protruding unit 12$b$ in the vibrator 11 when T/(B+C) is high (when, for example, the depth of the groove 12$c$ is deep).

When a progressive vibration wave is generated in the vibrator 11, bending becomes deformed under a state where a thickness portion of an adhesive surface of the piezoelectric body 13 from a base unit of the groove 12$c$ in the elastic body 12 and thickness of the piezoelectric body 13 are matched (in other words, bending deformation occurs when there is no protruding unit 12$b$).

A neutral plane of the bending exists between the base of the groove 12$c$ in the elastic body 12 and a lower surface of the piezoelectric body 13. Swinging motion in the driving direction occurs in the protruding unit 12$b$ when adding the bending vibration generated under the state where the thickness portion of an adhesive surface of the piezoelectric body 13 from a base unit of the groove 12$c$ in the elastic body 12 and thickness of the piezoelectric body 13 are matched.

Motion in the driving direction on a tip (driving unit) of the protruding unit 12$b$ is small when T/(B+C) is low and large when T/(B+C) is high.

The magnitude of speed of the protruding unit 12$b$ is roughly estimated as follows. Additionally, the motion in the driving direction is defined as ((B+C)/2). The motion in the driving direction occurs under the state where the thickness portion of an adhesive surface of the piezoelectric body 13 from a base of the groove 12$c$ in the elastic body 12 and thickness of the piezoelectric body 13 are matched. The drive surface 12$a$ moves in the driving direction by (T+(B+C)/2)/((B+C)/2) times. For example, when T is increased, swing of the drive surface 12$a$ increases by the same amount.

When T/(B+C) is high, the motion in the driving direction is large, and this increases force applied from the mover 15 to the drive surface 12$a$. For example, when displacement of the motion in the driving direction doubles, speed and acceleration also double, and double the force (load) is applied to the drive surface 12$a$ when the mover 15 that is in contact with the drive surface 12$a$ tries to move. As a result, the vibration wave motor 10 can fail to drive when, for example, there is a large speed variation such as that when the vibration wave motor 10 starts up.

In the third embodiment, when a lead-free piezoelectric body 13 having small density is incorporated into the vibrator 11, in order to improve the Lm of the vibrator 11, T/(B+C) is increased to higher than when a PZT piezoelectric body 13 is incorporated into the vibrator 11. Therefore, in this case, the above-described situation is more likely to occur.

As a result, the inventors conducted an investigation and found that, when the vibration wave motor 10 starts up, the above-mentioned problem can be solved by increasing the time taken to vary frequency when frequency is swept.

Figure 9:
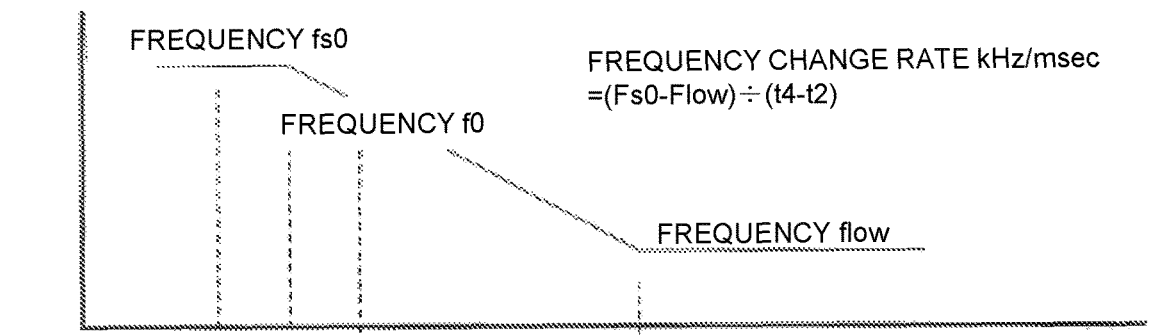
FIG. 9 is a diagram of a sequence when the vibration wave motor is started up.
Figure 9:
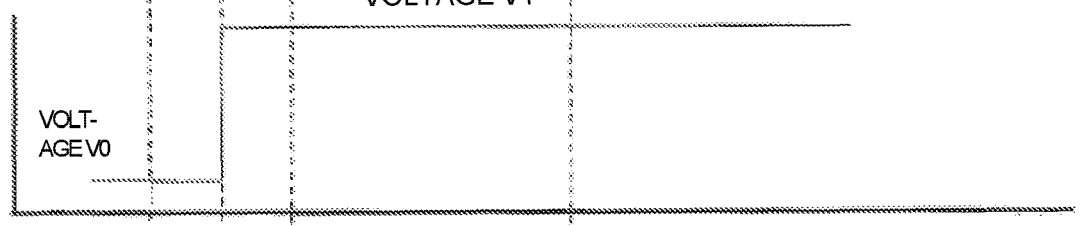
Figure 9:
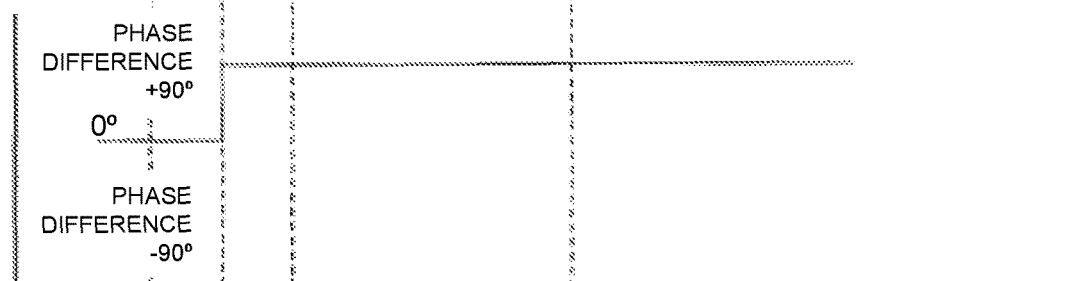
Figure 9:
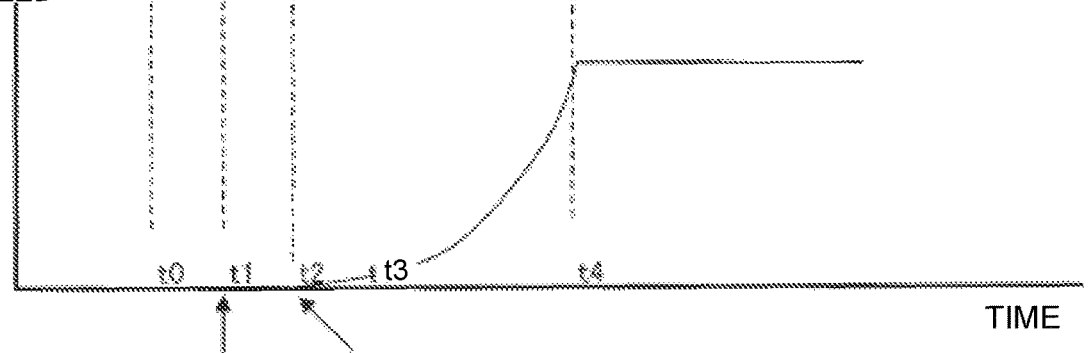

FIG. 9 is a diagram of a sequence when the vibration wave motor 10 is started up.

Under a state (t0) where there is no drive command from the control unit 68, fs0 represents drive frequency, V0 represents drive voltage (=0 V) and the difference between the A-phase and the B-phase is 0°.

When a drive command is output from the control unit 68 (t1), the drive frequency is still set as fs0, the drive voltage is set as a voltage V1 and the difference between the A-phase and the B-phase is set as 90° (−90° during inversion driving). At this time, rotational speed is 0.

When drive frequency is gradually decreased and frequency at t2 is f0, the mover 15 is driven.

At a time t4, the frequency becomes "flow" and rotational speed reaches a target speed Rev1.

In this embodiment, the time taken to vary frequency when frequency is swept is increased according to the value of T/(B+C).

More specifically, the difference in frequency between flow and fs0 and the difference between the times t4 to t2 are set to be relevant to each other.

In addition, when the value of T/(B+C) is low, the difference between the times t4 to t2 is shortened and, when the value of T/(B+C) is high, the difference between the times t4 to t2 is lengthened.

Increasing start-up time in this way reduces reaction force from the mover 15 applied to the vibrator 11 of the vibration wave motor 10 during startup.

When the vibration wave motor 10 is equipped with PZT (T/(B+C): 1.08), the frequency change rate of frequency sweep at startup is about 1 kHz/m sec.

When T/(B+C) is within a range of from 1.2 to 1.7, motion of the drive surface 12$a$ in the driving direction increases by about 1.1 to 1.4 times compared to when T/(B+C) is 1.08. Therefore, the time t4 to t2 is increased by 1.4 times.

That is, if the frequency change rate of frequency sweep is around 1/1.4 and 0.7 kHz/m sec, load on the vibration wave motor 10 is approximately equal to or less than that when equipped with PZT (T/(B+C): 1.08).

Further, when T/(B+C) is within a range of from 1.7 to 2.8, motion of the drive surface 12$a$ in the driving direction increases by about 1.4 to 2.0 times compared to when T/(B+C) is 1.08.

Therefore, when the time t4 to t2 is increased by 2.0 times, that is, when the frequency change rate of frequency sweep is about 1/2.0 and 0.5 kHz/msec, load on the vibration wave motor 10 is approximately equal to or less than that when equipped with PZT (T/(B+C): 1.08).

Varying the frequency change rate according to the T/(B+C) enables the vibration wave motor 10 to start up reliably even if speed fluctuation such as that during start up is large (that is, load on the vibrator 11 of the vibration wave motor 10 is large).

This embodiment disclosed an example of a vibration wave motor 10 which used a progressive vibration wave with the number of waves being four or nine. But the same effect can be achieved with other numbers of waves such as five to eight, or 10 waves or more, provided that the motor has the same configuration and is controlled in a similar manner.

In addition, when T/(B+C) is 1.7, the frequency change rate may be 0.5 kHz/msec or less even if the frequency change rate is 0.7 kHz/msec or less.

Figure 10:
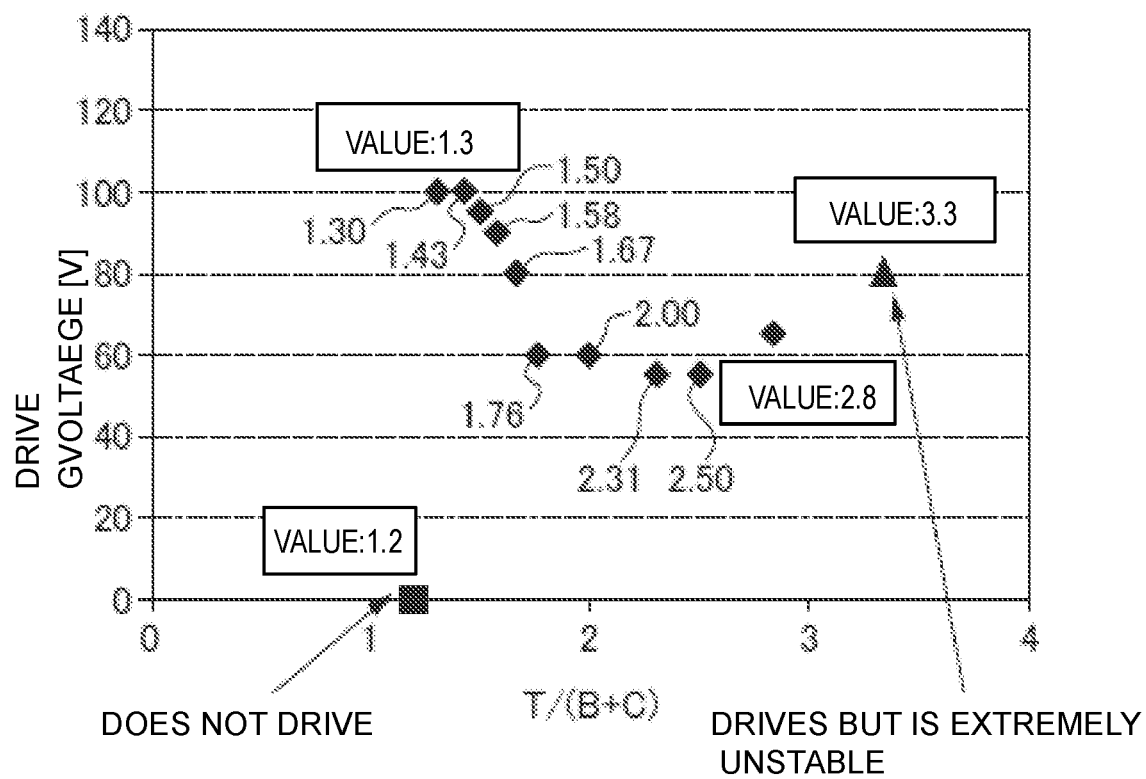
FIG. 10 is the graph of FIG. 7 with number values added.

As illustrated in FIG. 10, in terms of the T/(B+C) explained above in the first and second embodiments, drive voltage is preferably about 60 V when T/(B+C) is within a range of from 1.76 to 2.8. In addition, the drive voltage preferably decreases even further when T/(B+C) is within a range of from 1.76 to 2.50.

Note that the embodiments and modified embodiments may be combined as necessary, but a detailed description thereof is omitted herein. Further, the present invention is not limited by the above-described embodiments.

What is claimed is:

1. A lens barrel comprising:
   an electromechanical conversion element;
   an elastic body which has a joining surface on which the electromechanical conversion element is joined and a drive surface on which a vibration wave is generated due to vibration of the electromechanical conversion element, the elastic body on which a plurality of grooves are formed;
   a motion member which makes contact with the drive surface and is configured to rotate by the vibration wave;
   a rotating ring which has a recess part and is configured to rotate by rotation of the motion member;
   a moving ring which has a protrusion part engaged to the recess part and is configured to move to an optical axis direction by rotation of the rotating ring; and
   a lens which is held in the moving ring;
   wherein the electromechanical conversion element is made of a material having sodium potassium niobate, potassium niobate, sodium niobate or barium titanate as a principle component,
   wherein a value of T/(B+C) is within a range of from 1.3 to 2.8 when:
   length from the drive surface to a base unit of at least one groove of the plurality of grooves is defined as T;
   length from the base unit of the groove to the joining surface is defined as B; and
   thickness of the electromechanical conversion element is defined as C.

2. The lens barrel according to claim 1, further comprising:
   a control unit configured to control to drive an actuator which has the electromechanical conversion element, the elastic body and the motion member.

3. The lens barrel according to claim 2, further comprising:
   a detector configured to detect position or speed of the moving ring and transmit the detected value to the control unit as an electrical signal.

4. The lens barrel according to claim 3,
   wherein the control unit is configured to control based on the electrical signal transmitted from the detector.

5. The lens barrel according to claim 4,
   wherein the actuator is configured to set a voltage to predetermined value when a drive command from the control unit is input.

6. The lens barrel according to claim 5,
   wherein the actuator is configured to change a frequency after the voltage has been set to the predetermined value.

7. The lens barrel according to claim 6,
   wherein the actuator is configured to change a change rate of the frequency based on the value of T/(B+C).

8. The lens barrel according to claim 7,
   wherein the actuator is configured to set the change rate of the frequency to 0.7 kHz/msec when T/(B+C) is within a range of from 1.3 to 1.7, and equal to or less than 0.5 kHz/msec when T/(B+C) is within a range of from 1.7 to 2.8.

9. An imaging device comprising:
   the lens barrel according to claim 1; and
   a camera body.

* * * * *